US012799016B2

(12) United States Patent
Grieco et al.

(10) Patent No.: US 12,799,016 B2
(45) Date of Patent: Nov. 17, 2026

(54) APPARATUS FOR DRYING AND/OR CONSOLIDATING A PREFORM FOR OPTICAL FIBRES

(71) Applicant: Prysmian S.p.A., Milan (IT)

(72) Inventors: Stefano Grieco, Giffoni Valle Piana (IT); Valeria Caronna, Salerno (IT); Angelo Mascolo, Bagnoreale (IT); Giuditta Pirozzi, Santa Maria a Vico (IT)

(73) Assignee: Prysmian S.p.A, Milan (IT)

(*) Notice: Subject to any disclaimer, the term of this patent is extended or adjusted under 35 U.S.C. 154(b) by 118 days.

(21) Appl. No.: 18/884,612

(22) Filed: Sep. 13, 2024

(65) Prior Publication Data

US 2025/0091933 A1 Mar. 20, 2025

(30) Foreign Application Priority Data

Sep. 14, 2023 (IT) ........................ 102023000018873

(51) Int. Cl.
*C03B 37/014* (2006.01)

(52) U.S. Cl.
CPC ................................ *C03B 37/0146* (2013.01)

(58) Field of Classification Search
None
See application file for complete search history.

(56) References Cited

U.S. PATENT DOCUMENTS

| | | | | |
|---|---|---|---|---|
| 6,543,257 | B1 * | 4/2003 | Koaizawa | C03B 37/01486 65/530 |
| 2006/0112733 | A1 | 6/2006 | Ishihara et al. | |
| 2016/0280583 | A1 * | 9/2016 | Uchida | C03B 37/0146 |

(Continued)

FOREIGN PATENT DOCUMENTS

| | | | |
|---|---|---|---|
| IT | 202200010907 | A1 | 11/2023 |
| JP | H-11349342 | A | 12/1999 |
| WO | 2018177514 | A1 | 10/2018 |

OTHER PUBLICATIONS

JP 2005314184 machine translation, Tanada Haruyoshi, Apparatus and method of heating glass member, Nov. 2005 (Year: 2005).*

(Continued)

*Primary Examiner* — Queenie S Dehghan
(74) *Attorney, Agent, or Firm* — Jason A. Smith; Shumaker, Loop & Kendrick, LLP

(57) ABSTRACT

An apparatus for drying and/or consolidating an optical fibre preform; includes a furnace having a muffle tube and forming a muffle chamber configured to house and allow passage of a preform, a hollow connection member configured to allow passage of the preform, the connecting member being removably connected to the muffle tube; a hood positioned on top of the connection member, wherein the hood includes a hood lid closing the hood at its top, wherein the hood lid includes a through-hole for the passage of a supporting rod, and a sealing assembly including a first sealing element within the hood and a second sealing element on top of the hood lid, in which each sealing element includes a respective first and second ring-shaped seal contacting the supporting rod and being radially inward of a first and second expansible member configured to allow passage of the supporting rod.

15 Claims, 8 Drawing Sheets

(56) References Cited

U.S. PATENT DOCUMENTS

2023/0382781 A1* 11/2023 Grieco ................ C03B 37/0146

OTHER PUBLICATIONS

JP 2003212557 machine translation, Ishihara Tomohiro, Method and Apparatus for Manufacturing Glass Preform, Jun. 2003 (Year: 2003).*

JP 201214893 machine translation, Yamazaki et al., Sealing Method of Optical Fiber Drawing Furnace, Aug. 2012 (Year: 2012).*

* cited by examiner

APPARATUS FOR DRYING AND/OR CONSOLIDATING A PREFORM FOR OPTICAL FIBRES

FIELD OF THE INVENTION

The present disclosure relates to an apparatus for processing an optical fibre preform, in particular a preform for the production of a transmission optical fibre.

BACKGROUND

A common procedure to obtain a glass preform to be drawn down to an optical fibre suitable for telecom applications comprises a first process for producing a core rod of solid glass and a second process in which an overcladding is added to the core rod, for example by deposition of soot about the core rod or by jacketing the core rod in a glass tube (rod-in-tube technology).

Core rods may be made by outside deposition processes, such as outside vapour deposition (OVD) and vapour axial deposition (VAD) or by inside deposition processes, such as Modified, or Furnace Chemical Vapour Deposition (MCVD/FCVD), or Plasma Chemical Vapour Deposition (PCVD). When made by OVD or VAD, a soot precursor body is formed, which is the dried to remove water and consolidated to form a core glass body. A stretching often follows the consolidation in order to reduce the diameter of the glass body which is then severed into a plurality of core rods.

Formation of a cladding region on the core rod by a flame hydrolysis deposition process, such as by OVD, is often employed because it allows a relatively fast and economical process of producing a soot optical preform from a core rod. Partially porous soot preforms are subsequently treated with a drying agent and they are then consolidated inside a furnace into a dense glass preform at temperatures higher than the glass transition temperature.

In processes commonly used for dehydration and consolidation, a porous or partially porous soot preform is inserted into a furnace comprising a cylindrically-shaped muffle. The preform is then pulled up as a transparent silica glass preform above the furnace after vitrification.

Drying is performed by heating the preform to a typical temperature of about 1100° C. in the presence of one or more drying gases, such as a mixture of helium and chlorine. Consolidation is performed by heating the dried preform typically to a temperature between 1400° C. and 1600° C.

Given that drying and consolidation take place at different temperatures, the furnace muffle is often configured to have different zones for the drying and the consolidation phases. In some furnaces, during consolidation, the preform is lowered through a central hot zone set at a temperature inducing consolidation of the soot preform. In furnace tubes for dehydration and consolidation configured to house a moving preform across zones at different temperatures, the length of the chamber is typically required to be at least twice longer than the preform length. Cost savings may be attained by the use of larger preforms, such as preforms of increasing length, e.g. more than 2 m.

WO 2018/177514 A1 concerns an apparatus and method for drying and consolidating a preform, which comprises a chamber for housing at least a length portion of the preform, wherein the chamber can be connected to the elongated chamber of the furnace tube so as to form a vertical extension of the first elongated chamber. The drying process may start with the preform not completely inserted into the furnace tube and the overall length of the furnace tube can be kept relatively short in relation with the length of the preform.

Unpublished patent application IT102022000010907 A relates to an apparatus for drying and/or consolidating an optical fibre preform, comprising:

- a muffle tube configured to house a preform, the muffle tube having a muffle opening at its top side, which is configured to allow passage of the preform;
- an extension tube configured to house at least a length portion of the preform, the extension tube is removably attached to the muffle tube so as to close the muffle opening to form a single chamber,
- a hood placed on a top side of the extension tube to define an inner space, and including a discharge port, and
- a sealing assembly operatively connected with the hood and including a ring-shaped seal and an expansible member configured to allow passage of the supporting rod and to expand and contract in a vertical direction, wherein the ring-shaped seal is located radially inward of the expansible member and operatively connected thereto and has an inner diameter configured to directly contact the supporting rod.

US 2006/0112733 A1 addresses the problem of how to restrain gas leakage in junction part between a furnace muffle tube and a lid. The equipment for manufacturing a glass preform described in the document comprises a furnace muffle tube in which a soot glass deposit body is placed; a lid for sealing up an inlet-outlet opening of the furnace muffle tube, and a heater for heating the soot glass deposit body.

SUMMARY

Dehydration and/or consolidation of an optical fibre preform within a furnace typically takes place under a flow of an inert gas or of a gas mixture containing an inert gas. Helium is a preferred inert gas because it can be easily dissolved in the preform both as a single gas, for example during consolidation, and as a diluent carrier gas, such as during dehydration with chlorine-containing compounds or during fluorine doping of the preform.

The Applicant has observed that the quality of a consolidated preform depends, among other factors, on the gas flow of helium during processing of the preform. In particular, defects in the drawn optical fibre due to the presence of air has been seen to be associated with an insufficient flow of helium gas within the furnace. In many cases, bubbles/holes affect discontinuous short lengths of the optical fibre, these defects being commonly referred to as “airlines”. Airlines and defects related thereto can be detected from diameter measurement of optical fibres in the drawing process and in particular from diameter oscillations. A parameter indicative of the quality of the optical fibre is the so-called Draw Cumulated Defect Ratio (DCDR), which is defined as the ratio between the sum of the lengths (e.g. in meters) of the defective drawn optical fibre portions shorter than 18 m and the overall drawn fibre length. Good quality of an optical fibre is typically associated with a DCDR value of less than 2%, preferably less than 1%.

In processes commonly used for dehydration and consolidation, a soot preform is inserted into a furnace comprising a quartz muffle tube, generally of cylindrical shape. The preform is suspended by a handle, which is joined to or integral with the preform, for its insertion and extraction into/from the furnace and, typically, for the rotation of the preform about its longitudinal axis. To this purpose, an upper end of the preform handle is connected to a moving system for the translational movement and the rotational movement.

The hood or any lid closing the top of the furnace tube needs a central aperture for the insertion/extraction passage in/from the furnace tube of the preform supported by handle. The Applicant has noted that, if on one hand the central aperture should be designed to minimize or avoid leakages of the gases from the furnace, on the other hand any design should allow a safe movement up and down and the rotation of the supporting handle within the central aperture. Furthermore, the Applicant has observed that the supporting handle, commonly made of quartz, is often not precisely machined. This may lead to gas flowing out from the top central aperture during the vertical movement and rotation of the preform handle.

The Applicant has considered that, although the gas quantities involved are expected to be small, consumption of helium gas may turn out to be significant, given that processing time for dehydration and consolidation of a preform may last, for example, from 10 up to 20 hours with a helium consumption of about 15-30 l/min.

The quartz supporting handle carries a relatively heavy preform (for example of 5 to 100 kg) while undergoing vertical and rotational movements. Under these conditions, the handle is prone to build-up stresses that may induce off-axis bending, causing ovality or more generally lack of conformity in the consolidated preform.

The Applicant has considered a furnace comprising a muffle tube, which is closed at the top by a hood and has devised a sealing assembly positioned within the hood, the sealing assembly being aimed at reducing the leakage of processing gases from the chamber of the furnace to the outside. It is herein disclosed an apparatus for drying and/or consolidating an at least partially porous optical fiber preform, the apparatus comprising:

- a furnace comprising a muffle tube extending along a vertical axis and forming a muffle chamber configured to house a preform, the muffle tube having a muffle upper opening at its top side, which is configured to allow passage of the preform;
- a hollow connection member having an inner diameter configured to allow passage of the preform and extending along the vertical axis, the connecting member being removably connected to the muffle tube at the muffle opening;
- a hood positioned on top of the connection member, the hood being removably connected to or integral with the connection member, the hood having an interior space in vertical alignment with the connection member, wherein the hood comprises a hood lid closing the hood at its top, wherein the hood lid comprises a through-hole axially aligned with the muffle opening, the hood lid through-hole being configured for the passage of a cylindrical supporting rod of a supporting handle for the suspension of the preform; and
- a sealing assembly comprising a first sealing element housed within the interior space of the hood and a second sealing element on top of the hood lid, both the first and the second sealing element being substantially centred on the vertical axis, wherein the first sealing element and second sealing element comprise a respective first and second ring-shaped seal and a first and second expansible member having a generally tubular shape configured to allow passage of the supporting rod and to expand, contract and bend, wherein each first and second ring-shaped seal is located radially inward of the respective first and second expansible member and operatively connected thereto, the ring-shaped seals being sized to directly contact the supporting rod.

The first sealing element and second sealing element of the present description allows the use of a reduced helium flow rate during the processing of the preform by preventing the penetration, directly or indirectly, of air into the process chamber and maintaining the quality of the consolidated preform.

The first and second expansible members may expand and contract mainly in vertical direction, but also in radial direction, though to a minor extent. The first and second expansible members may also bend in the event of the supporting rod misalignment from the vertical axis.

Provision of a sealing assembly comprising an axially expansible member (like the expansible members of the present disclosure) allows absorbing mechanical stresses caused by potential offsets not only in the axial direction, but also in the radial direction, which are possibly caused by the vertical movement and rotation of the supporting handle and/or by small variations of the internal pressure in the processing chamber due to the gasses flowing therein. In view of its flexibility, the expansible member may help in improving centring the supporting handle and managing micro-variation in the pressure.

In one or more embodiments, the expansible member is made of a polymeric material. For example, the expansible member is made of a thermoplastic polymer. For example, the expansible member is made of a thermoplastic fluoropolymer, such as PTFE (polytetra-fluoroethylene), PCTFE (polychlorotrifluoroethylene) or PFA (perfluoroalkoxyalkane).

In an embodiment, the connection member comprises a tubular body extending along the vertical axis of the apparatus.

In an embodiment, the connection member has a length, taken along the vertical axis (Z), of from 5 to 20 cm.

In an embodiment, the tubular body has a finned outer surface.

In an embodiment, each of first and second expansible members comprises:

- a pleated portion configured to expand, contract and bend;
- a non-axially expandable portion contiguous to the pleated portion along the vertical axis; and
- a base contiguous to the pleated portion and opposite to the non-expandable portion, the expansible member base extending radially outwardly of the pleated portion.

In an embodiment, the first and second ring-shaped seal are engaged to the non-axially expandable portion of the relevant first and second expansible member.

In an embodiment, the non-axially expandable portion engaging the first and second ring-shaped seal lies on top of the pleated portion.

In an embodiment, each first and second ring-shaped seal has an inner diameter configured to directly contact the supporting rod. In an embodiment, the inner diameter of each of the first and second seal is sized to have a tight connection with the supporting rod.

The first and second expansible members have an inner diameter that varies across its length down to a minimum value which is larger than the inner diameter of the relevant ring-shaped seal so as to allow the passage of the supporting rod.

In an embodiment, the hood comprises a hood sidewall and a lower flange positioned opposite to the hood lid. The hood lower flange extends radially inwardly from the hood sidewall and has an inner diameter substantially equal to the inner diameter of the connection member.

In an embodiment, the apparatus of the present disclosure further comprises a lower cover plate configured to be positioned on the lower flange of the hood. The lower cover plate has a through hole in alignment with the through hole of the hood lid, and an outer diameter greater than the inner diameter of the connection member.

Together with the hood sidewall and the hood lid, the lower cover plate defines an interior space of the hood.

In an embodiment, the hood is removably connected to the connection member. In this case the connection member comprises an upper flange at the top of its tubular body and extending radially outwardly from the same, and the hood lower flange is positioned on this upper flange of the connection member and connected to the same, for example by connecting elements, like screws.

In an embodiment, the hood is integral with the connection member and the hood lower flange is integral with the tubular body of the connection member. In this case the hood lower flange is a common flange for both the connection member and the hood.

In an embodiment, the sealing assembly further comprises:

a plurality of springs extending parallel to the vertical axis of the apparatus and arranged so as to radially surround the first sealing element; and an annular supporting flange placed on the lower cover plate, the plurality of springs being constrained, at one end, to the supporting flange and extending therefrom toward the hood lid.

In an embodiment, each of the plurality of springs is mounted on a respective vertical supporting element fixed to the supporting flange. Each of the plurality of springs may be longer than the respective vertical supporting element and may have a length sized to extend from the annular flange to the hood lid.

In an embodiment, the first sealing element is mounted on the annular supporting flange by the expansible member base.

In an embodiment, the apparatus of the present disclosure further comprises an upper cover plate placed on the hood lid and having a central through hole in alignment with the through hole of the hood lid.

In an embodiment, the second sealing element sticks out from the upper cover plate in axial alignment with the first sealing element.

Within the present description and claims by "axial direction" or "axially" it is meant a direction substantially parallel to an axis taken along the main extension of the furnace, in particular the muffle tube, and of the vertical movements of the preform.

By "radially" or "radial direction" it is meant a direction substantially perpendicular to the axial direction.

BRIEF DESCRIPTION OF THE DRAWINGS

The present invention will now be described in more detail hereinafter with reference to the accompanying drawings, in which some, but not all embodiments of the invention are shown. In general, the same reference numeral will be used for possible variant embodiments of similar elements. Drawings illustrating the embodiments are schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the disclosure.

Figure 1:
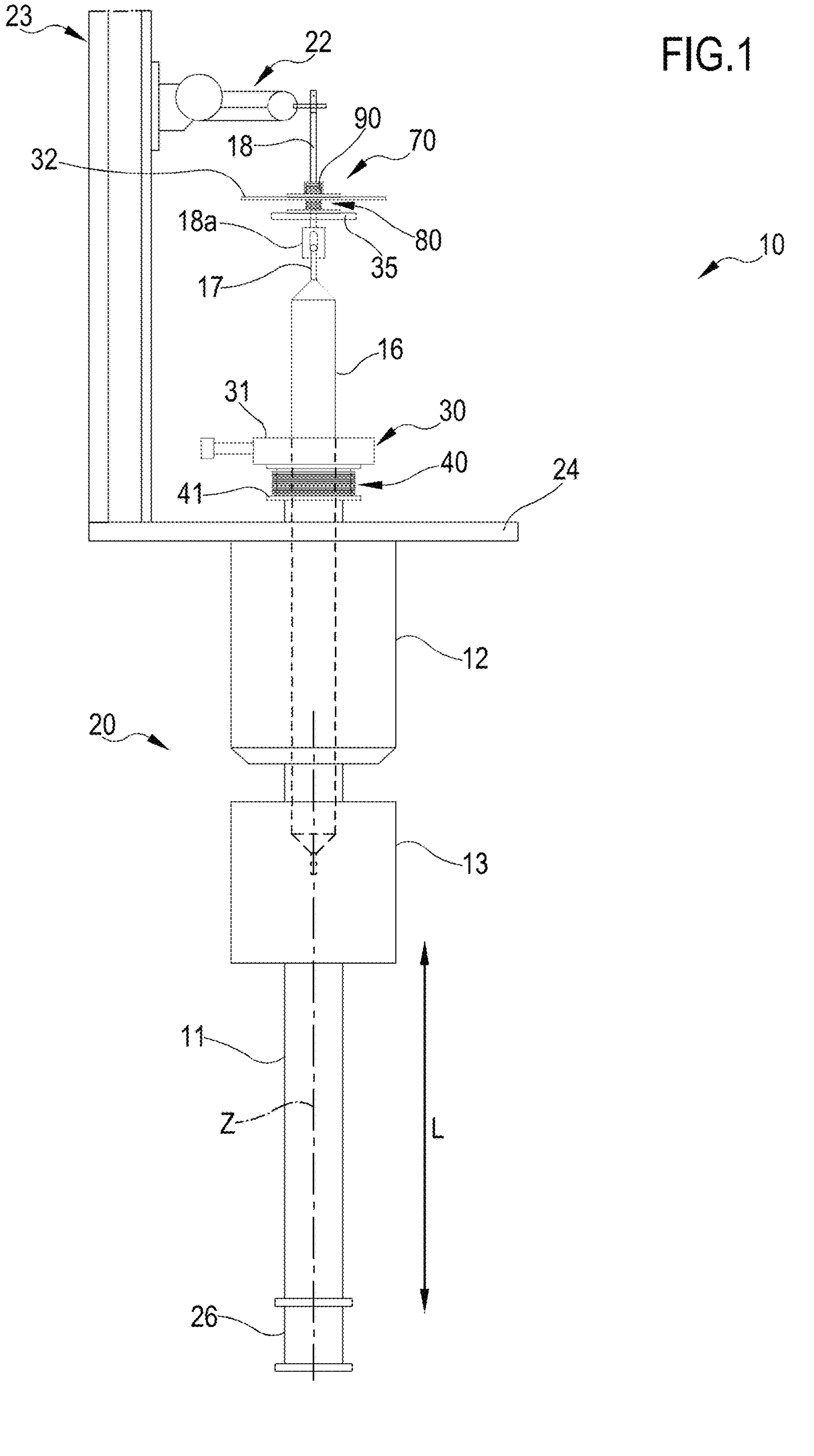

FIG. 1 is a partial front view of an apparatus for drying and consolidating an optical fibre preform, in a process stage when the preform is partially inserted in the muffle tube of the furnace, according to an embodiment consistent with the present disclosure.

Figure 2:
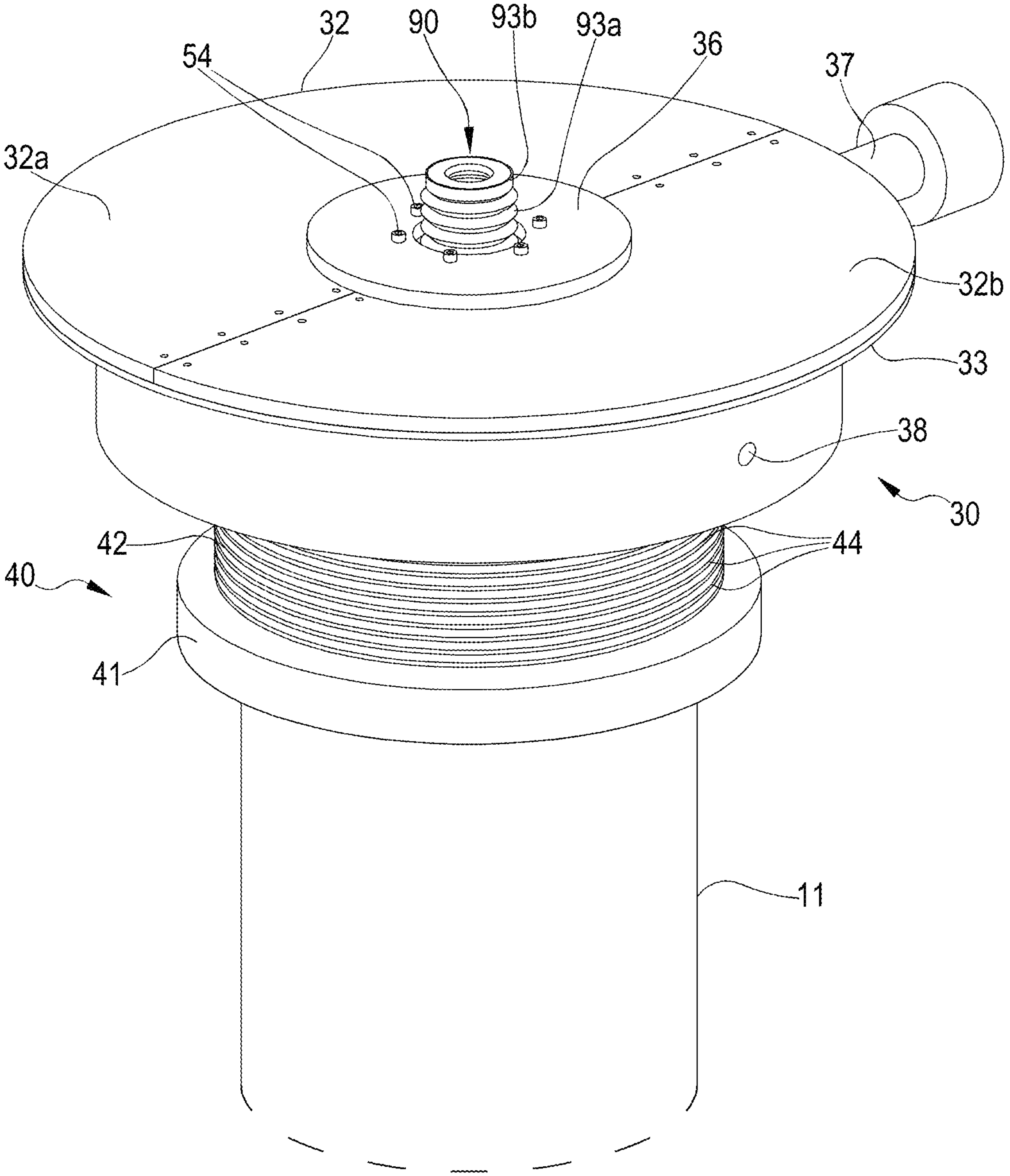

FIG. 2 is a partial perspective view of a hooded muffle tube of the furnace according to an embodiment consistent with the present disclosure, the muffle tube being partially shown.

Figure 3:
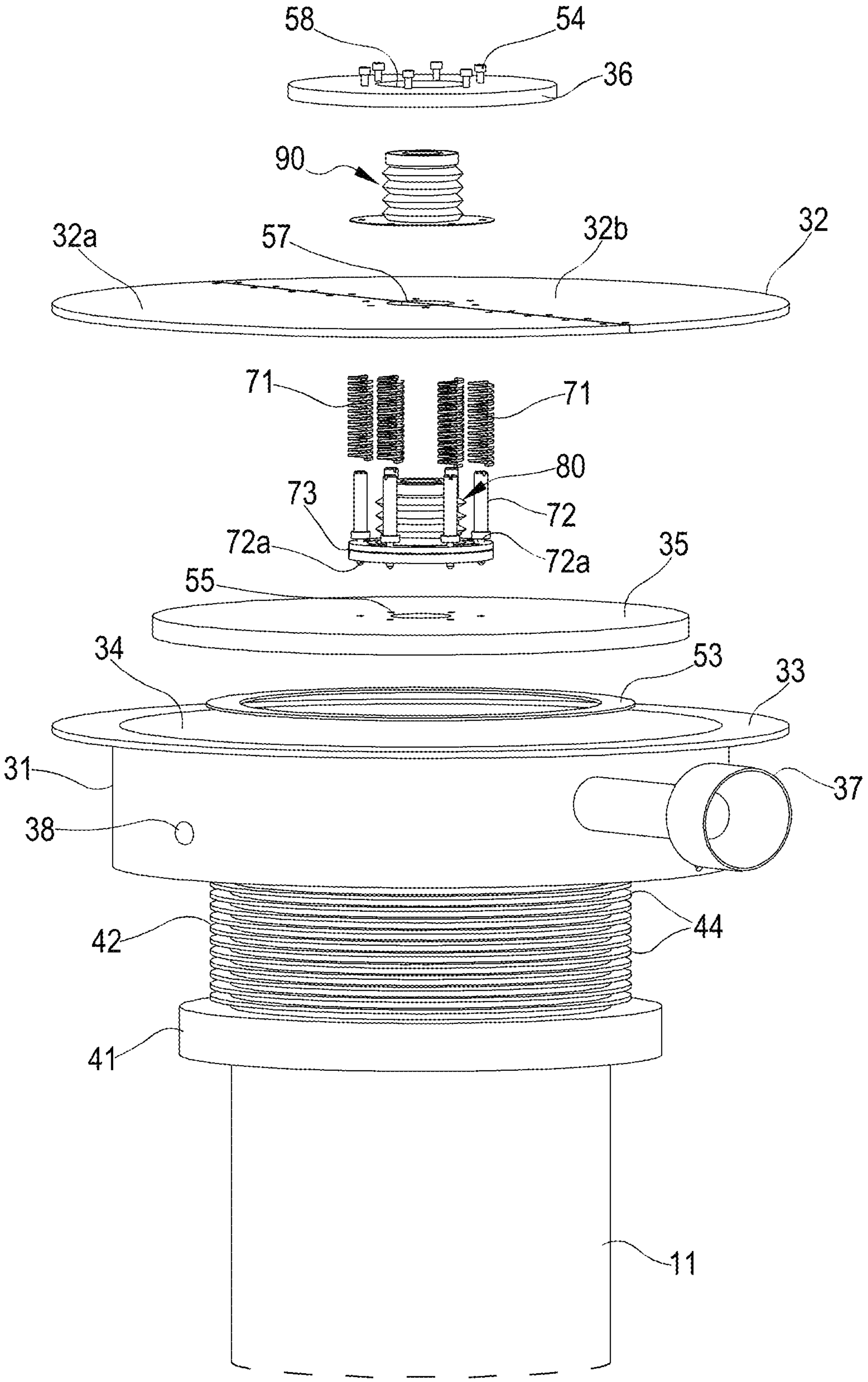

FIG. 3 is a partially exploded perspective view of the hooded muffle tube of FIG. 2.

Figure 4:
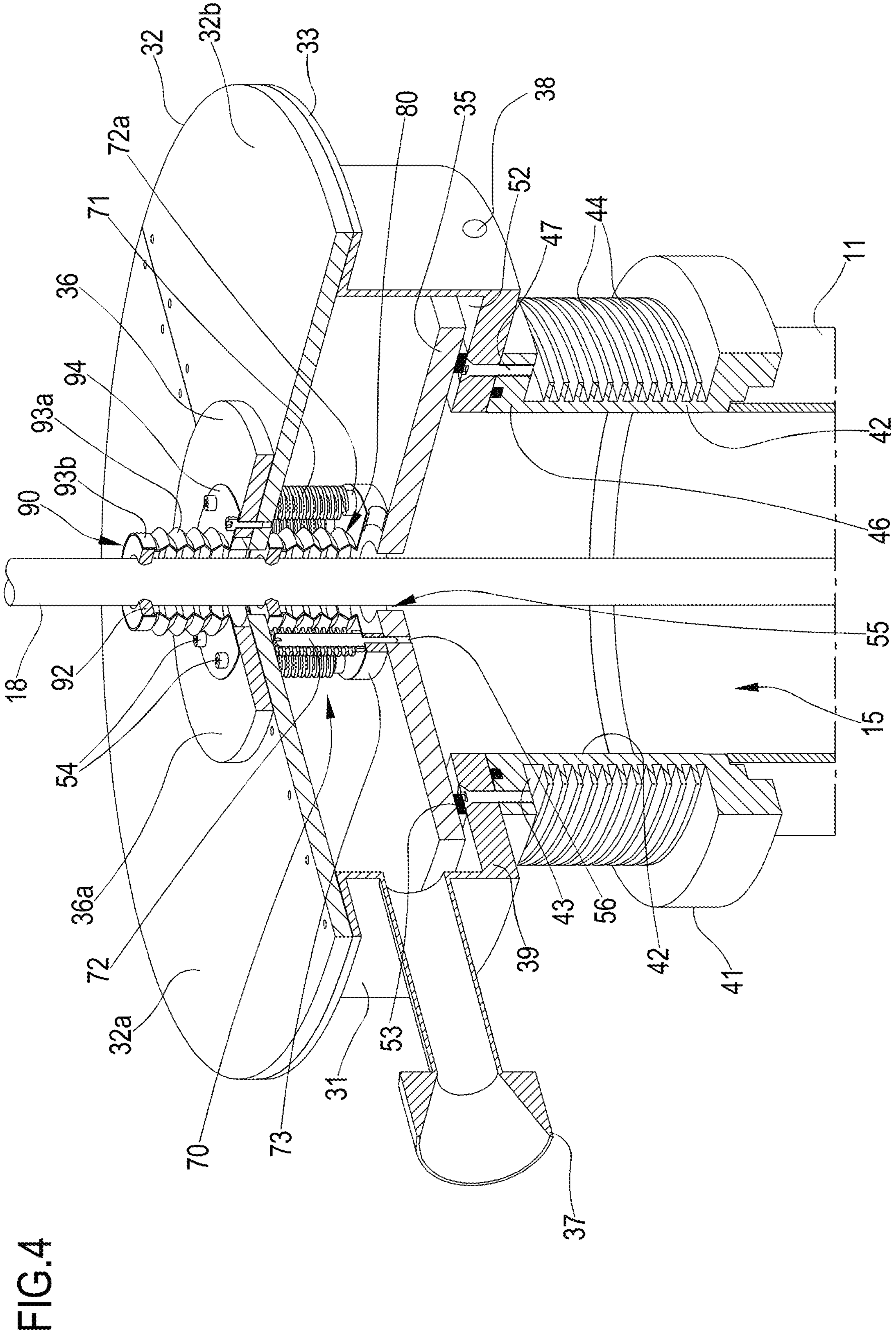

FIG. 4 is a partial perspective view of the top portion of a hooded muffle tube, according to an embodiment consistent with the present disclosure. Some parts are shown in cross-sectional view.

Figure 5:
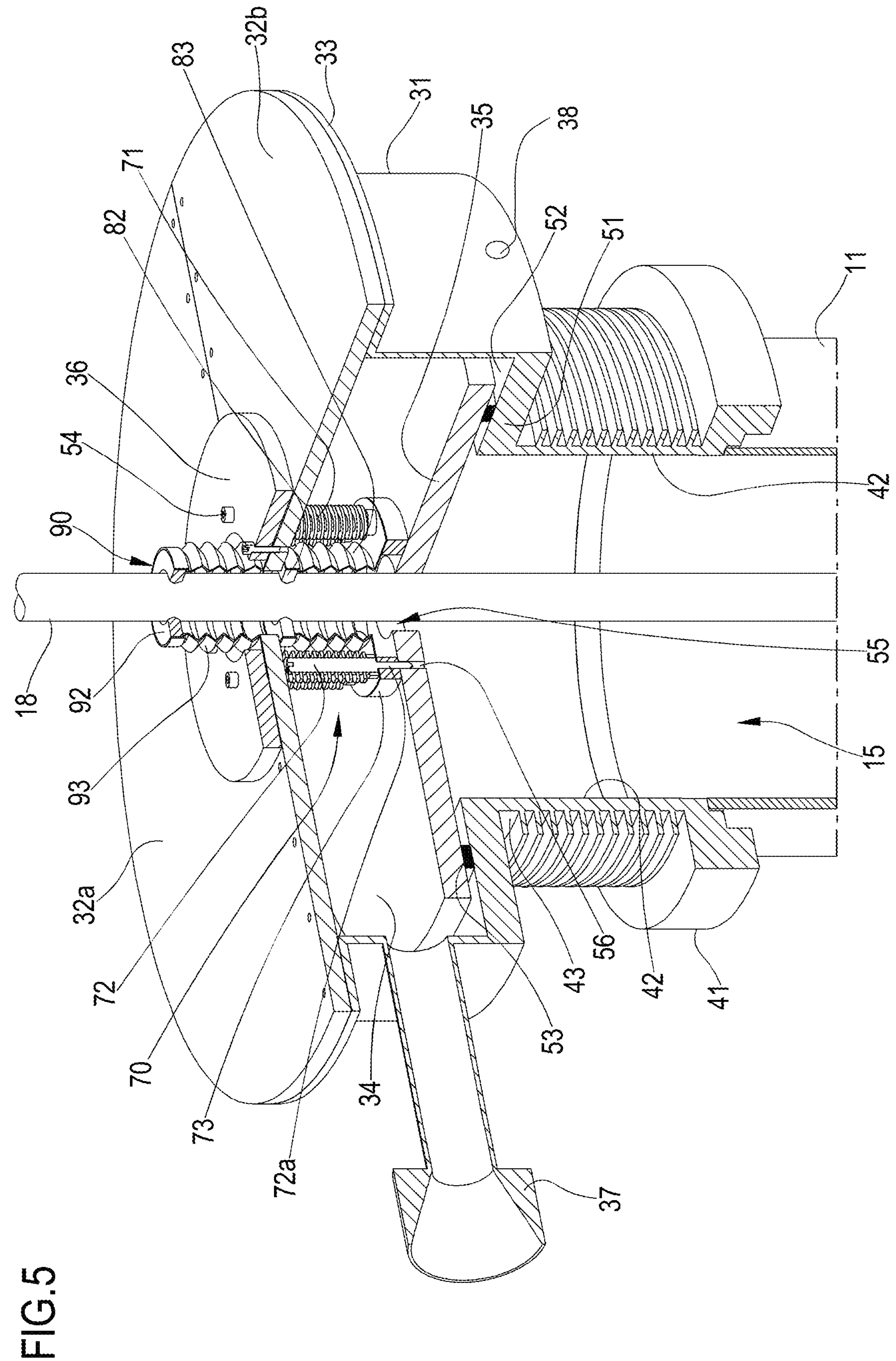

FIG. 5 is a partial perspective view of the top portion of the hooded muffle tube, according to a further embodiment consistent with the present disclosure. Some parts are shown in cross-sectional view.

Figure 6:
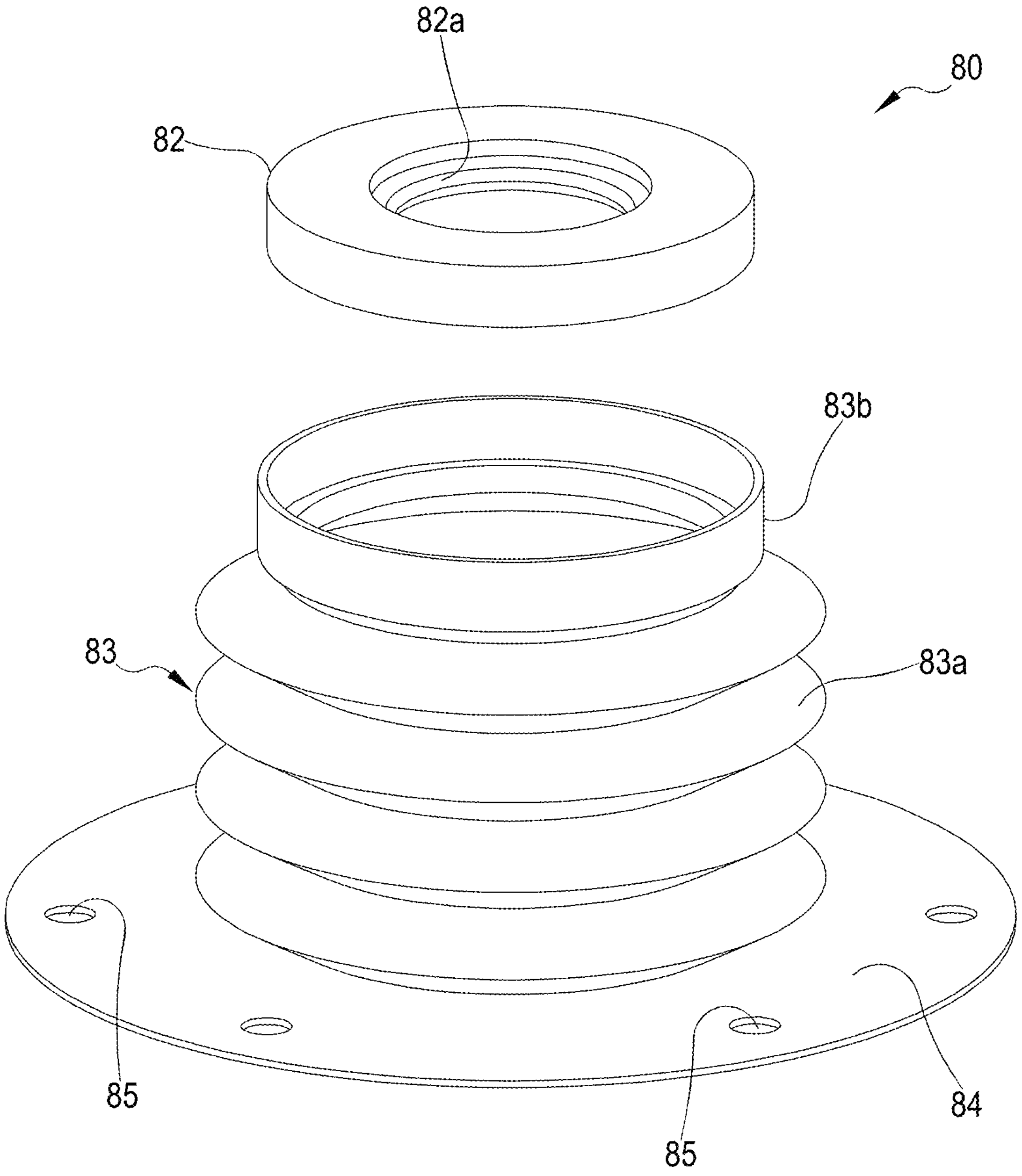

FIG. 6 is an exploded perspective view of a first sealing element according to embodiments consistent with the present disclosure.

Figure 7:
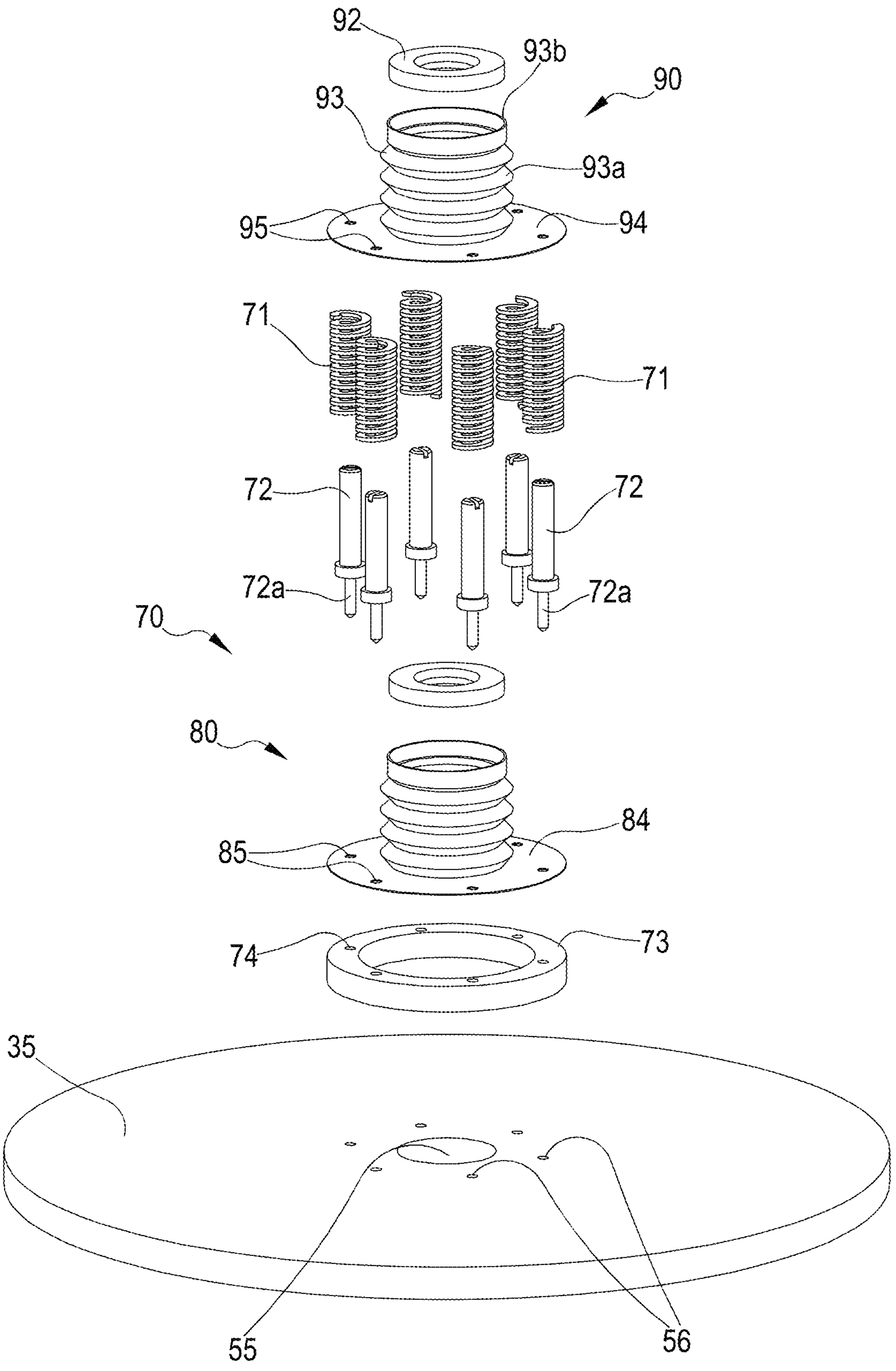

FIG. 7 is an exploded perspective view of a sealing assembly comprising the first sealing element of FIG. 6 and a second sealing element.

Figure 8:
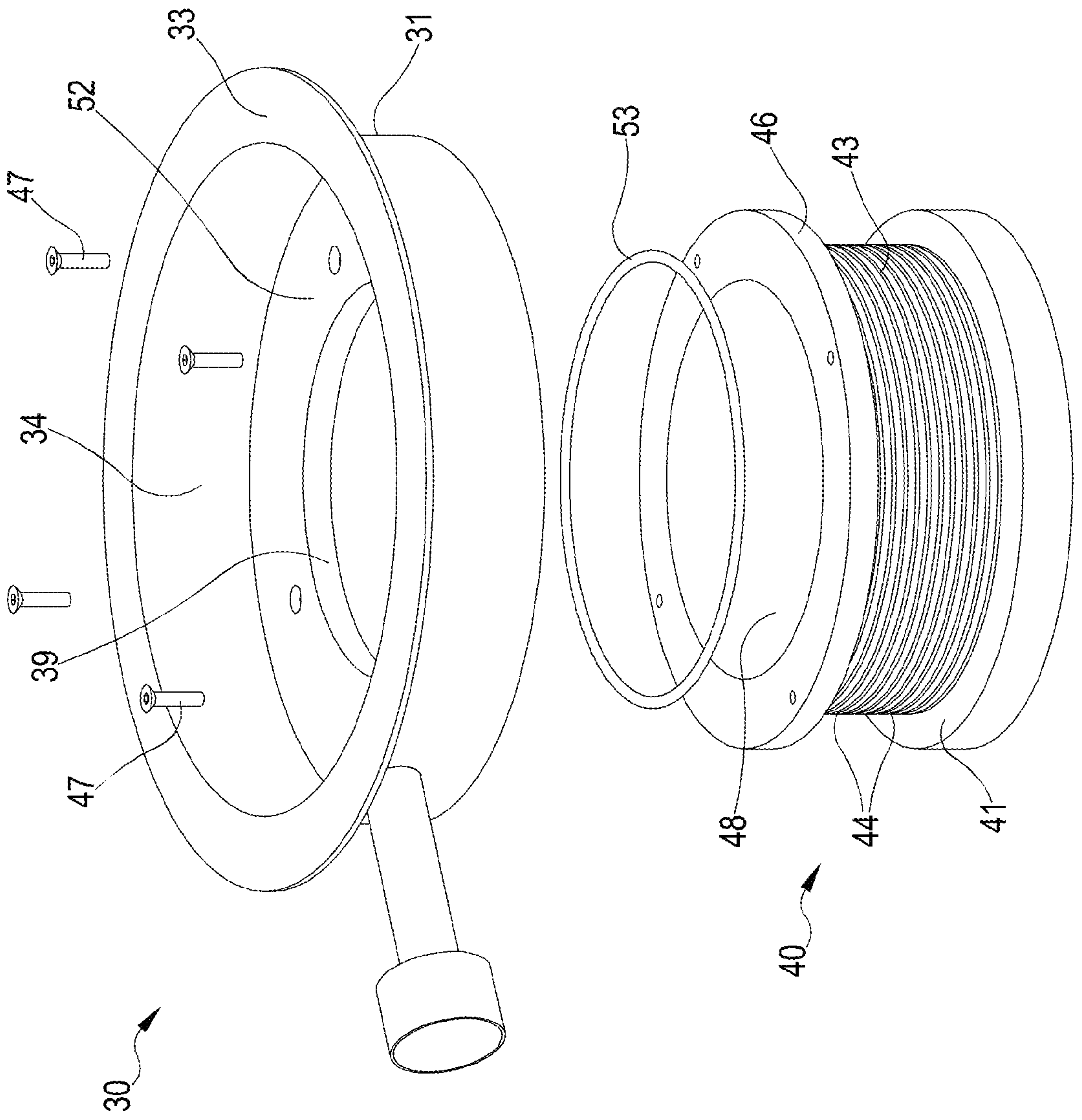

FIG. 8 is an exploded perspective view of the hood and the connection member, in accordance with embodiments in which the hood and the connection member are separate elements.

The present disclosure can be implemented according to one or more of the present embodiments, optionally combined together.

DETAILED DESCRIPTION

FIG. 1 illustrates an apparatus 10 for processing an optical fibre preform 16, in an embodiment consistent with the present disclosure. The apparatus 10 comprises a furnace 20, which can be of conventional type, the furnace 20 comprising a muffle tube 11 of substantially cylindrical shape. The furnace 20 and specifically the muffle tube 11 extends along a vertical axis, indicated with Z. A double arrow L indicates an axial or vertical direction of the up and down movement of the preform 16 into and out of the muffle tube 11.

The terms "upper" and lower" or "top" and "bottom" or "below" and "above" when referring to the apparatus 10 are defined with respect to the axial or vertical directions L. These terms are used to indicate the relative position of the elements to one another in the present apparatus or during the processing of the preform.

The terms "inner" and "outer" or "radially inner" and "radially outer" or "inward" and "outward" or "radially inwardly" and "radially outwardly", with reference to the elements of the apparatus, are intended to refer to the relative radial position thereof.

The muffle tube 11 has an inner sidewall forming a muffle chamber of substantially cylindrical shape. The muffle tube and thus the muffle chamber has a generally elongated shape configured to house an optical fibre preform 16. The muffle tube 11 has an upper opening 15 at its top side (shown in FIGS. 4 and 5), hereinafter also indicated as muffle opening, which is configured to allow for the passage (insertion/extraction) of the preform 16 in the muffle tube 11. The upper opening 15 is centred on the Z-axis.

The up and down movement of the preform 16 into the muffle tube is along the Z-axis.

The muffle tube 11 is made of glass, in particular of quartz. Customarily, muffle tubes for processing silica-based preforms for the production of optical transmission fibres are made of highly pure quartz to avoid contaminations in the preform during heating.

In the embodiment shown in FIG. 1, the furnace 20 is designed for drying and consolidating a porous preform. By "porous preform" in this application it is meant both a totally porous preform (e.g. for the formation of a glass core rod) and a partially porous preform comprising a porous soot layer for the formation of an intermediate cladding and/or an overcladding on a glass core rod.

The furnace 20 comprises at least one heater, for example, a first heater 12, surrounding the muffle tube 11 in an upper length of the muffle tube. The first heater 12 defines a first heating zone extending over the upper length of the muffle tube 11 and thus of the furnace chamber. In operation, the first heating zone is set at a first temperature suitable for dehydration and/or doping of the porous layers of the preform. For example, the first temperature is of from 850° C. to 1350° C.

A second heater 13, which may be positioned below the first heater 12 with respect to the axial directions L, may surround the muffle tube 11. The second heater 13 defines a second heating zone extending over a lower length of the muffle tube 11. In operation, the second heating zone is set at a second temperature suitable for consolidation of the porous preform into a solid glass preform. The second temperature is higher than the first temperature and it is usually of from 1450° C. to 1600° C.

In an embodiment, the furnace comprises a single heater comprising a first and a second heating zone.

Typically, the overall length of the muffle tube 11 and thus of the furnace chamber, taken in the Z-axis, is greater than the length of the preform 16 so that the latter can move up and down, in the direction L, inside the furnace chamber. In an embodiment, the length of the furnace chamber is at least 1.5 times the length of the preform to be processed. For example, the preform has a length of from 2.0 to 3.5 meters.

Typically, first and second heaters 12, 13 are ring-shaped to surround the muffle tube 11. For example, each of heaters 12, 13 comprises one or more annular heating elements.

Dimensions of the muffle tube 11 may be designed based on the dimension of the preform to be processed in the apparatus 10 so as to allow a down and up movement of the preform 16 without the inner sidewall of the muffle tube 11 touching the preform.

Typically, the preform 16 is provided with a preform handle 17 of known type and made of quartz. The preform handle 17 can be joined to or be integral with the preform.

The preform handle 17 is suspended and supported by a supporting rod 18. The supporting rod 18 terminates in a holding portion 18*a* positioned at a bottom end of the supporting rod 18 and configured to hold the preform handle 17. In the non-limiting example of FIG. 1, the holding portion 18*a* is a C-shaped hook integral to the supporting rod 18. Suspension of the preform 16 can be carried out in different known ways, such as by the provision of an enlarged-width portion in the preform handle (not shown).

Typically, in a process of dehydration and consolidation, the porous preform 16 is gradually inserted in the muffle tube 11 of the furnace. Processing of the preform 16 start by fully inserting the preform 16 in the muffle tube 11.

In known ways, the supporting rod 18 is operatively connected to a moving system 22 mounted on a supporting structure 23, e.g. a tower, which are only schematically and partially shown in FIG. 1. The tower 23 may stand on a supporting plane 24, for example a floor area having an opening for communication with the muffle tube positioned below the supporting plane. The moving system 22, which may be of known type, is designed for the vertical movement of the preform 16, i.e. for the insertion and extraction of the preform in/from the muffle tube 11, and for the rotational movement of the preform about the Z-axis.

A hollow connection member 40, described in more detail in the following, is removably fixed to the muffle tube 11. A hood 30 is placed on the connection member 40 and connected to the same. In the processing stage shown in FIG. 1, the hood 30 is in its open condition. Both the hood 30 and the connection member 40 are positioned in axial alignment with respect to the muffle tube 11.

In a non-limiting way, the hood 30 has a larger width in the radial direction than that of the connection member 40, in particular than the width of the tubular body 42, which will described in more detail below. The hood 30 comprises a hood sidewall 31 of cylindrical shape and a disc-shaped hood lid 32 configured to close the hood at its top (FIGS. 2-5). The hood lid 32 is positioned above and in axial alignment with the hood sidewall 31. A sealing assembly 70, described in more detail in the following, is operatively associated with the hood lid 32. When the preform is completely inserted in the muffle tube 11, the hood lid 32 is placed on the hood sidewall 31 so as to close from the top the muffle tube 11.

The furnace 20 comprises one or more gas inlets, only schematically indicated in FIG. 1 with gas inlet part 26, which is connected with the chamber of the muffle tube 11 for the supply of one or more gases passing through and/or around the preform 16. In the non-limiting example illustrated in FIG. 1, gases enter the furnace chamber from the bottom of the muffle tube 11 and stream upwards. Typically, the gas outflow openings are positioned at the opposite side of the furnace with respect to the gas inlet part 26.

In an embodiment, the preform 16 is moved through the first heating zone of the first heater 12 of a relatively limited length, i.e. shorter than the length of the preform, and then to the second heating zone of the second heater 13.

The dehydration process starts by drying the portion of the preform positioned in the first heating zone, so that the portion of the preform 16 inserted in the muffle tube 11 lies above the second heating zone. In this way, consolidation of the lowermost portion of the preform does not take place before its drying. The preform 16 is maintained in this position for a certain time, such as from 60 to 90 minutes. Subsequently, the preform is gradually lowered through the first heating zone at a given rate so as to dehydrate the whole preform when the entire preform length has passed the first heating zone. The lowering rate may be for example of from 2 mm/min to 10 mm/min.

When the preform is down driven through the first heating zone, successive longitudinal portions of the preform are exposed to the first heating zone and subsequently to the second heating zone. Typically, during dehydration and consolidation, the preform rotates about its longitudinal axis in order to improve axial symmetry. In ways per se known, a rotation transmission mechanism (not shown) coupled to the supporting rod 18 transmits rotation to the preform 16.

The muffle tube 11 may extend below the second heating zone for a length configured to house the whole preform as a cooling zone. Typically, cooling is carried out after consolidation while flowing inert gas, such as helium, across the muffle tube.

In an embodiment, the porous glass soot preform is a silica-based porous glass preform for the fabrication a silica-based optical fibre of low attenuation for use in telecommunication systems. The porous soot layers can be formed by known methods, such as a flame hydrolysis process of silica-based soot or combustion of silica-based reactants as octamethylcyclotetrasiloxane (OMCTS, also called D4).

The apparatus 10 is suitable for drying and consolidating a porous optical fibre preform. In an embodiment, the preform, before undergoing dehydration and/or consolidation, has a porous overcladding layer formed around a glass core rod. In ways per se known, after consolidation, the solid glass preform can be drawn in an optical fibre.

It is to be understood that the arrangement of the heating zones with respect to the preform may be different from those described above and shown in FIG. 1. For example, in alternative to the illustrated embodiment, the furnace 20 may have a single heating zone for dehydration and/or consolidation. The present disclosure encompasses a furnace designed for either dehydration or consolidation of a porous preform.

After cooling, the muffle tube 11 is opened by lifting the hood lid 32 from the hood sidewall 31 to allow the removal of the preform 16 from the muffle tube 11.

The outline of the process described with reference to FIG. 1 can be applied to any embodiment shown in FIGS. 2 to 8 and more generally herein disclosed, in particular to the embodiments envisaging an assembly of the hood 30 and the connection member 40 attached to one another as separated elements (as from FIG. 4) or built as one-piece (as from FIG. 5). In the latter case, the hood 30 comprises the connection member 40, which is connected to the muffle tube 11.

FIG. 2 is a partial perspective view of a hooded muffle tube of the apparatus according to embodiments consistent with the present disclosure, whereas FIG. 3 is a partially exploded perspective view of the same hooded muffle tube of FIG. 2.

A hollow connection member 40 is removably connected to the muffle tube 11 at the muffle opening 15. The hollow connection member 40 has a generally cylindrical shape with an interior space 48 (indicated in FIG. 8). The connection member 40 comprises a tubular body 42 extending in the vertical axis Z. The tubular body 42 has an inner diameter configured to allow passage of a preform, when in an operative condition.

The tubular body 42 has an outer surface 43 (indicated in FIGS. 4 and 5 and 8). In embodiments, the outer surface 43 is finned with a plurality of heat-dissipating fins 44 extending outwardly therefrom. The heat-dissipating fins 44 can be arranged parallel to one another.

The connection member 40 comprises a lower flange 41 positioned at the bottom of the tubular body 42 and integral to the same. The lower flange 41 is fixed to the muffle tube 11 by means of fastening elements (not shown).

The connection member 40 can be made of metal, such as aluminium or anodised aluminium. The hood 30 is removably fitted to or integral with the connection member 40, the hood having an interior space 34 (indicated in FIGS. 3 and 5) in alignment with the interior space 48 of the connection member 40.

As already said above, the hood 30 comprises a hood sidewall 31 and a hood lid 32. The hood lid 32 comprises a central through-hole 57 (FIG. 3) axially aligned to the muffle upper opening 15, and configured for the passage of the supporting rod 18 for the suspension of the preform 16 via the preform handle 17.

The through-hole 57 of hood lid 32 has a diameter sized to leave a radial gap around the supporting rod 18 for an axial movement through the hood 30 with limited radial offset.

The hood sidewall 31 and the hood lid 32 define the hood interior space 34.

The through-hole 57 is in communication with the inner space 34 of the hood.

In the embodiments shown in the figures, the hood sidewall 31 has, at its top, an upper flange 33 extending radially outwardly therefrom. The upper flange 33 is integral with the sidewall 31. The hood lid 32 is disposed on the upper flange 33 of the hood sidewall 31. In the embodiments illustrated in the figures, the hood lid 32 is placed on the upper flange 33 with no fastening.

The hood lid 32 may be kept in place by its weight that exerts a downward force.

In another embodiment (not shown), the hood lid 32 may be fastened to the sidewall 31 or to the upper flange 33 by means of fastening elements.

The hood 30 is made of metal, such as aluminium or anodised aluminium.

In the embodiments illustrated in the figures, the hood lid 32 is made of two half-disks 32*a* and 32*b* connected to each other For example, the two parts 32*a*, 32*b* are fixed to one another by fixing bracket.

This arrangement may ease maintenance of the element, although it should not be considered as limitative.

The hood sidewall 31 comprises an exit hole 38 for the outflow of the treatment gases flowing within the muffle tube 11 (FIGS. 2-5). These gases may pass through a pressure control piping (not illustrated).

The hood 30 may be provided with a gas-discharge port 37 in addition to the exit hole 38. The gas discharge port 37 is a safety port useful in the event of an unwanted discharge of the gases.

To this purpose, the gas discharge port 37 is connected to an external exhaust pipe (not shown in figures).

When the hood 30 is connected with the muffle tube 11 via the connection member 40 (either integral to the hood or as a separate element connected to the same) and closed by the hood lid 32, a sealed chamber is formed which is in communication with the exterior through the through-hole 57 of the hood lid 32.

With reference to FIGS. 1, 3 to 5 and 7, the hood 30 comprises a lower cover plate 35 which, in operation, is placed within the interior space 34 of the hood 30. The lower cover plate 35 is disc-like shaped and is sized to cover the hollow interior space 48 of the connection member 40. The lower cover plate 35 has a central through hole 55 configured for the passage of the supporting rod 18 hanging the preform 16.

The through-hole 57 of the hood lid 32 and the through-hole 55 of the lower cover plate 35 have both a circular cross-section with a centre positioned substantially on the same axis (i.e. the Z-axis), i.e. the through-holes 55 and 57 are in axial alignment to one another.

In embodiments, the lower cover plate 35 is made of an inorganic material, for example a metal like anodised aluminium, a mineral or a ceramic material.

FIG. 4 illustrates an embodiment of the hooded muffle tube of the apparatus 10, in which the hood 30 and the connection member 40 are two separate elements connected to one another along the Z axis. As described in the foregoing, the lower flange 41 of the tubular body 42 is connected to the muffle tube 11. The connection member 40 further comprises an upper flange 46 positioned opposite to the lower flange 41. The upper flange 46 is integral to the tubular body 42.

The lower and upper flanges 41 and 46 extend outwardly from the tubular body 42, in particular from the sidewall of connection member 40.

In the embodiment shown in FIG. 4, the hood 30 comprises a hood lower flange 39 integral to the hood sidewall 31 and opposite to the hood lid 32. The hood lower flange 39 extends inwardly from the sidewall 31 to leave a central opening facing the hollow space 48 of the connection member 40. The hood lower flange 39 has an upper supporting surface 52. The hood 30 and the connection member 40 are joined to one another through a connection between the hood lower flange 39 and the upper flange 46 of the connection member 40.

The hood 30 is placed on top of the connection member 40 by positioning the hood lower flange 39 on the connection member upper flange 46 and by fastening them to one another by means of bolts 47. To this end, the hood lower flange 39 and the upper flange 46 are provided with a respective plurality of through holes in axial alignment with one another for the insertion of the bolts 47.

The lower cover plate 35 is placed on the hood lower flange 39.

FIG. 5 illustrates a further embodiment of the hooded muffle tube of the apparatus 10. Unlike the embodiment illustrated in FIG. 4, the hood 30 is integral with the connection member 40. The hood 30 comprises a hood lower flange 51 having an upper supporting surface 52. The supporting surface 52 extends parallel to the hood lid 32. The lower flange 51 is integral to the hood sidewall 31 and to the tubular body 42 of the connection member 40. The lower flange 51 extends radially inwardly with respect to the hood sidewall 31 to leave a central opening facing the hollow space 48 of the connection member 40.

In the embodiment of FIG. 5, the lower cover plate 35 is placed on the supporting surface 52 of the lower flange 51.

In embodiments, an O-ring gasket 53 may be interposed between the upper supporting surface 52 of each hood lower flange 39, 51 and the lower cover plate 35. The O-ring gasket 53 may be made of a carbon allotrope-based material, such as graphite. The O-ring gasket can dampen the contact between the supporting surface 52 of the hood 30 and the lower cover plate 35 when the latter descends with the preform 16 and the hood lid 32 to close the muffle tube 11.

Inward extension of the hood lower flange 39 or 51 is configured to allow the passage of a preform.

The sealing assembly 70 is arranged at the hood 30. The sealing assembly 70 is substantially centred on the vertical axis Z so as to be aligned with the central through-hole 57 of the hood lid 32.

The sealing assembly 70 comprises a first sealing element 80, shown in more detail in the exploded view of FIG. 6. In operation, the first sealing element 80 is positioned within the interior space 34 of the hood 30. The lower cover plate 35 provides a base for the positioning and fastening of the first sealing element 80 within the interior space 34 of hood 30.

The first sealing element 80 is substantially axially centred to the hood through-hole 57 and to the central through hole 55 of the lower cover plate 35.

The first sealing element 80 comprises a ring-shaped seal 82. The seal 82 is in direct contact to the supporting rod 18 of the supporting handle 19. In particular, the seal 82 has an inner diameter configured to directly contact the outer diameter of the supporting rod 18. In an embodiment, the inner diameter of seal 82 is sized to have a tight connection with the supporting rod 18.

In an embodiment, the ring-shaped seal 82 includes a sealing lip 82*a* (visible in FIG. 6) for engagement with the supporting rod 18. The seal 82 may also include a garter spring (not shown in the figures), for example coupled to the sealing lip 82*a*, for a tighter contact with the supporting rod 18 while the latter axially moves and rotates about its axis.

In embodiments, the ring-shaped seal 82 is made of a thermoset elastomeric polymer, for example of a fluoropolymer (fluoroelastomer), which are generally suitable for continuous use at relatively high temperatures, up to 200-300° C.

The first sealing element 80 further comprises an expansible member 83 configured to expand or contract in an axial direction, in particular in the directions L. The expansible member 83 has a tubular shape with an inner diameter configured to allow the passage of the supporting rod 18.

In an embodiment, the expansible member 83 is made of a thermoplastic polymer. For example, the expansible member is made of a thermoplastic fluoropolymer, such as PFTE (polytetrafluoroethylene), PCTFE (polychlorotrifluoroethylene) or PFA (perfluoroalkoxy alkane). In the embodiments shown in the Figures, the expansible member 83 comprises a pleated portion 83*a* configured to expand and contract in vertical directions L and a non-axially expandable portion 83*b* contiguous to the pleated portion 83*a* in the axial direction. In an embodiment, the non-axially expandable portion 83*b* is integral with the pleated portion 83*a*.

The pleated portion 83*a* has a length varying, in the axial directions L, from a minimum value to a maximum value.

The inner diameter of the pleated portion 83*a* may vary across its length, provided that its minimum inner diameter is larger than the inner diameter of the ring-shaped seal 82 so as to allow the passage of the supporting rod 18. Due to the pleated shape of the pleated portion 83*a* and the associated constraints in the axial direction, the expansible member 83 has an overall inner and outer diameter which may vary along its length, when in operation.

In embodiments, the minimum inner diameter of the expansible member 83 is larger than the inner diameter of the ring-shaped seal 82 so that the supporting rod 18, in typical conditions during processing of the preform, is in contact only with the seal 82.

The non-axially expandable portion 83*b* has an annular shape with an inner diameter and an outer diameter coaxial one another. In the expansible member 83, the minimum inner diameter is sized so as to leave a radial gap around the supporting rod 18 for an axial movement with limited radial offset. In an embodiment, the minimum inner diameter of the expansible member 83 corresponds to the inner diameter of the non-expandable portion 83*b*.

The first sealing element 80 comprises a hollow base 84 positioned at the bottom of the expansible member 83. The expansible member base 84 is contiguous to the pleated portion 83*a* and opposite to the non-expandable portion 83*b* with respect to the pleated portion. The hollow base 84 extends radially outwardly of the pleated portion 83*a* and has an inner diameter substantially equal to the inner diameter of the non-axially expandable portion 83*b*. In embodiments, the expansible member base 84 may be integral with the pleated portion 83*a*, as illustrated in FIG. 6.

The base 84 comprises a plurality of holes 85 for the fastening of the first sealing element 80 to the lower cover plate 35 of the hood 30, as described in more details later.

The ring-shaped seal 82 is operatively connected to the non-axially expandable portion 83*b*. In the embodiments shown in the figures, the ring-shaped seal 82 is housed within the non-expandable portion 83*b* of the expansible member 83, and held in place, for example, by compression. The non-axially expandable portion 83*b* has a radial cavity configured to house the ring-shaped seal 82, which is located within the radial cavity so as to extend up to the most radially inward position of the first sealing element 80 with respect to the central axis Z (FIGS. 4 and 5). In this way, the most radially inward position of the first sealing element 80 corresponds to the inner diameter of the ring-shaped seal 82.

In the embodiment in which the ring-shaped seal 82 includes a sealing lip 82*a*, the inner diameter of the sealing lip represents the most radially inward position of the first sealing element.

The disposition of the expansible member 83 is such that the non-expandable portion 83*b* housing the ring-shaped seal 82 lies above the pleated portion 83*a*.

The through-hole 57 of the hood lid 32 may have a diameter larger than the outer diameter of the non-expandable portion 83*b* of the expansible member 83.

As the ring-shaped seal 82 is operatively connected with the supporting rod 18 and the first sealing element 80 is connected to the hood 30 by fastening the expansible member 83 to the lower cover plate 35 by the hollow base 84, the first sealing element 80 is suitable to compensate any potential offsets between the “fixed” elements 82 and 84 by the pleated portion 83*a*.

Chiefly, the axial movement of the expansible member 83 takes place in the expandable pleated portion 83*a*.

Being operatively connected to the supporting rod 18, the first sealing element 80 provides for a sealed engagement with the supporting handle 18 that effectively reduces the escape of the processing gases from the interior of the sealed chamber (mainly from the central hole 55 of the lower cover plate), without impairing the movement of the supporting handle 18 through this chamber.

The sealing assembly 70, by means of the first sealing element 80, is designed to at least partly seal the through-hole 55 of the cover plate 35. At the same time, the sealing assembly 70 is designed to allow the vertical movement and the rotation of the supporting rod 18 of the preform handle 17 through the through-hole 57 of the hood lid 32.

The sealing assembly 70 comprises a supporting flange 73. The supporting flange 73 is annular of generally cylindrical shape. The supporting flange 73 is positioned on the lower cover plate 35 to surround its central hole 55. The supporting flange 73 has an inner diameter and an outer diameter, the inner diameter being larger than the diameter of the through-hole 55 of the cover plate 35.

The annular supporting flange 73 can be made of metal, such as (anodized) aluminum or steel. The sealing assembly 70 comprises a plurality of springs 71 (in the non-limiting illustrated example six springs) extending in the Z-axis, the springs 71 radially surrounding the first sealing element 80 and in particular the expansible member 83. The springs 71 are mounted on respective vertical supporting elements 72, such as vertically arranged rivets.

Springs 71 are fixed, at one end, on the annular flange 73 by means of the vertical supporting elements 72. In the embodiments shown in the figures, each vertical supporting element 72 comprises a male pin 72*a*, and the annular flange 73 comprises a plurality of through holes 74 configured to receive corresponding male pins 72*a* (FIG. 7).

Springs 71, which may be coil or helical springs, have a spring length at rest (not compressed) which is greater than the length of the vertical supporting elements 72 in such a way that an upper length portion of the springs may extend or contract in the vertical directions L. The length of springs 71 is selected so as to keep said springs in a partially compressed state between the annular flange 73 and the hood lid 32.

In the embodiments of the figures, the hollow base 84 of the first sealing element 80 is placed on the annular flange 73, specifically on the upper surface of the annular flange. The plurality of through holes 85 of hollow base 84 are arranged so as to correspond to a plurality of through holes 74 of the annular flange 73. The lower cover plate 35 is provided with a plurality of through holes 56 corresponding to the plurality of through holes 74 of the annular flange 73. In this way, the through holes 85, 74 and 56 are in axial alignment with one another. The subsequent insertion of the male pins 72*a* of the vertical supporting elements 72 into the plurality of through hole 74 fastens the first sealing element 80, the springs 71 and the annular flange 73 to the lower cover plate 35.

It is to be understood that other configurations for fastening the first sealing element 80 and/or the springs 71 to the lower cover plate 35 can be envisaged.

The first sealing element 80 and in particular the expansible member 83 is vertically constrained at one end by the tight contact of the ring-shaped seal 82 with the connection rod 18, but anywhere else the expansible member 83 can freely move axially across the allowed length. The ring-shaped seal 82, operatively surrounded by the non-axially expandable portion 83*b*, tightly engages the supporting rod 18 so as to close the central hole 55 of hood cover plate 35.

The first sealing element 80 as described in the foregoing significantly improves the sealing capability of the apparatus.

The Applicant has observed that the upward movement caused by the pressure of the gases flowing upward from the muffle tube may be counteracted by the downward force applied by the weight of the hood lid. The Applicant has realized that a lower cover plate having a weight larger than the pressure exerted by the gases flowing within the muffle tube would further hinder the outflow of gases from the connection member.

During the processing of the preform, the hood lid 32 of the hood 30 slightly urges the springs 71 down in the axial direction towards the lower cover plate 35. During processing, the gas outflow can escape through the exit hole 38. However, in case of an unwanted increase of the pressure of the gas outflow from the muffle tube 11, if on one hand such pressure would urge the lower cover plate 35 upwardly, the weight of the hood lid 32 forces such gases to outflow from the gas-discharge port 37.

The partially compressed state of the sealing assembly 70 between the lower cover plate 35 and the hood lid 32 can be pre-set and chosen by taking into account the expected processing parameters.

With reference to FIGS. 2 to 5, the hood 30 comprises an upper cover plate 36, which is placed on the hood lid 32, at the exterior side of the hood 30. The upper cover plate 36 has a through hole 58 (FIG. 3) in axial alignment with the through-hole 57 of the hood lid 32, the through-hole 58 being configured to allow the passage of the supporting rod 18.

The upper cover plate 36 of the figures is disk shaped, although other shapes are possible as long as a central through hole 58 is provided.

Provision of the upper cover plate 36 increases the weight exerted downward by the hood lid. In embodiments, the weight of the upper cover plate 36 and of the hood lid 32 may be selected so that their sum is greater than the pressure in the muffle during processing of the preform 16.

The upper cover plate 36 is made of metal, such as steel or anodized aluminum.

In embodiments, the hood lid 32 and the cover plate 36 have an overall weight of from 5 to 12 kg, preferably of from 6 to 10 kg.

The sealing assembly 70 of apparatus 10 comprises a second sealing element 90 positioned on top of the hood lid 32, at the exterior of the hood 30. The second sealing element 90 corresponds to the first sealing element 80, having essentially the same parts as of the first sealing element 80 illustrated in FIG. 6.

The second sealing element 90 is positioned in alignment with the through hole 58 and is configured to allow the passage of the supporting rod 18 as detailed in the following.

The second sealing element 90 is substantially axially centred to the hood through-hole 57 and to the central through hole 55 of the lower cover plate 35. The second sealing element 90 comprises a ring-shaped seal 92 sized to surround the supporting rod 18 (FIGS. 4 and 5). In particular, the seal 92 has an inner diameter configured to directly contact the outer diameter of the supporting rod 18. In an embodiment, the inner diameter of seal 92 is sized to contact the outer surface of the connection rod 18 while the latter axially moves and rotates about its axis. In embodiments, the ring-shaped seal 92 has a tight connection with the supporting rod 18.

In an embodiment, the ring-shaped seal 92 includes a sealing lip (not shown in the figures) for engagement with the supporting rod 18. The seal 92 may also include a garter spring (not shown in the figures), for example coupled to the sealing lip, for a tighter contact with the supporting rod 18 while the latter axially moves and rotates about its axis.

In embodiments, the ring-shaped seal 92 is made of a thermoset elastomeric polymer, for example of a fluoropolymer (fluoroelastomer), which are generally suitable for continuous use at relatively high temperatures, up to 200-300° C.

The second sealing element 90 comprises an expansible member 93 configured to expand, contract and bend, in particular in the direction L or departing therefrom. The expansible member 93 has a tubular shape with an inner diameter configured to allow the passage of the supporting rod 18.

In an embodiment, the expansible member 93 is made of a thermoplastic polymer. For example, the expansible member is made of a thermoplastic fluoropolymer, such as PFTE (polytetrafluoroethylene), PCTFE (polychlorotrifluoroethylene) or PFA (perfluoroalkoxy alkane). The expansible member 93 comprises a pleated portion 93*a* configured to expand and contract in vertical directions L and a non-axially expandable portion 93*b* contiguous to the pleated portion 93*a* in the axial direction (FIG. 7; elements 32 and 36 are omitted in the figure). In an embodiment, the non-axially expandable portion 93*b* is integral with the pleated portion 93*a*.

Provision of a second sealing element 90 helps maintaining the centring of all parts within the hood 30 with respect to the muffle tube 11. Further, the second sealing element further improves the sealing of the hood hole 57 thus avoiding the outflow of the process gases in the environment. The second sealing element 90 comprises a hollow base 94 contiguous to and extending radially outwardly from the expansible member 93. Specifically, the base 94 is contiguous to the pleated portion 93*a* and opposite to the non-expandable portion 93*b*, the base 94 extending radially outwardly of the pleated portion 93*a*.

The base 94 of the second sealing element 90 is fastened to the hood lid 32. The hollow base 94 comprises a plurality of holes 95 for the fastening of the sealing assembly 90 to the hood lid 32. To this end, each of the upper cover plate 36 and of the hood lid 32 has a plurality of through-holes corresponding to the through-holes of the hollow base 94 for the insertion of fastening elements 54, such as screws or bolts, as shown in FIGS. 2-5.

In an embodiment shown in FIG. 4, the hollow base 94 is fixed on the upper cover plate 36 fixed, in turn, on the hood lid 32.

In a further embodiment shown in FIGS. 2, 3 and 5, the hollow base 94 is placed between the hood lid 32 and the upper cover plate 36. The upper cover plate 36 is fixed to the hood lid 32 by means of the fastening elements 54. Fastening elements 54 passes through the plurality of holes 95 of the hollow base 94 to fasten the second sealing element 90 between the hood lid 32 and the upper cover plate 36. This configuration may improve stability of the sealing assembly 90 when the supporting rod 18 is lowered down into the furnace 20. Providing the cover plate 36 over the base 94 helps to prevent any lifting of the base 94 which is made of soft material. In this embodiment, at least one portion of the pleated portion 93*a* of the second sealing element 90 passes through the central hole 58 of the upper cover plate 36 in a way that the ring-shaped seal 92 is placed above the same.

At the beginning of the process of dehydration or consolidation of the preform, the optical fibre preform 16 is suspended and supported by the preform handle 17 connected to the supporting rod 18. Above the preform handle 17—thus above the optical fibre preform 16—the hood lid 32 and, optionally, the hood upper cover plate 36 and the second sealing element 90 are already fixed one another and connected to the supporting rod 18. The first sealing element 80 is sequentially connected to the lower cover plate 35 onto which the annular supporting flange 73, the springs 71, and the vertical supporting elements (e.g. rivets) 72 are mounted.

In the meantime, the hood 30 is connected to the furnace 20 by the connection member 40 in an "uncovered" condition, i.e. the hood does not contain the lower cover plate 35 and is not closed by the hood lid 32.

When the optical fibre preform 16 is lowered towards and into the furnace 20 by the moving system 22, the hood lower cover plate 35 contacts the hood lower flange 39 or 51, according to the embodiment of FIG. 4 or of FIG. 5, optionally by interposing the O-ring gasket 53 between the hood 30 and the connection member 40. Accordingly, the sealing assembly 70, in particular the first sealing element 80 fixed to the lower cover plate 35 by the annular supporting flange 73 and the springs 71 and vertical supporting elements (e.g. rivets) 72, is inserted into the hood interior space 34 and enclosed therein by the hood lid 32. The abovementioned weight of the hood lid 32 and, optionally, of the upper cover plate 36 ensure a suitable sealing of the hood interior space 34.

EXAMPLE

The new apparatus, indicated with apparatus B, was capable of assuring satisfactory performances, DCDR<1% with 1-55 He slpm, while an apparatus A not comprising the sealing assembly of the present disclosure completely failed at the same helium flow.

Several glass optical fibre preforms were fabricated by using an apparatus, i.e. apparatus B, as described in the foregoing and consistent with the embodiment described with reference to FIG. 4.

Apparatus A comprised a muffle tube surmounted by a cylindrical body similar to the connection member of the present disclosure. This cylindrical body and the upper portion of the muffle tube was surrounded by a chamber similar to the hood of the present disclosure. The chamber has an upper aperture which, when the supporting handle lowers the preform in the muffle tube, is closed by a quartz lid and an aluminium lid connected to the handle supporting rod. The quality of the fibres drawn from the optical fibre preforms was checked by determination of DCDR values. A DCDR value is herein defined as the ratio between the sum of all the fibre length portions shorter than 18 m of the drawn optical fibre found, while drawing, to be defective in the diameter measurements, and the overall drawn fibre length.

TABLE 1

| He flow (slpm) | DCDR Apparatus A | DCDR Apparatus B |
|---|---|---|
| 5 | 100% | <1% |

With reference to Table 1, at relatively low values of He flow of 5 slpm (standard liter per minute), apparatus A exhibited an unsatisfactory performance with very high DCDR values, in the practice all of the fibre length portions shorter than 18 m are defective and there is no fiber length portion longer than 18 m without defects. The He flow needed to achieve satisfactory performance was at least 15 slpm, in some cases 20-30 slpm.

In contrast, at the same helium flow, apparatus B showed a satisfactory performance with DCDR values of less than 1% with He flow of 5 slpm.

The invention claimed is:

1. An apparatus for drying and/or consolidating an at least partially porous optical fibre preform, comprising:

a furnace comprising a muffle tube extending along a vertical axis and forming a muffle chamber configured to house a preform, the muffle tube having a muffle upper opening at its top side, which is configured to allow passage of the preform;

a hollow connection member having an inner diameter configured to allow passage of the preform and extending along the vertical axis, the connecting member being removably connected to the muffle tube at the muffle opening;

a hood positioned on top of the connection member, the hood being removably connected to or integral with the connection member, the hood having an interior space in vertical alignment with the connection member, wherein the hood comprises a hood lid closing the hood at its top, wherein the hood lid comprises a through-hole axially aligned with the muffle opening, the hood lid through-hole being configured for the passage of a cylindrical supporting rod of a supporting handle for the suspension of the preform, and a sealing assembly comprising a first sealing element housed within the interior space of the hood and a second sealing element on top of the hood lid, both the first and the second sealing element being substantially centered on the vertical axis, wherein the first sealing element and second sealing element comprise a respective first and second ring-shaped seal and a first and second expansible member having a generally tubular shape configured to allow passage of the supporting rod and to expand, contract and bend, and wherein each first and second ring-shaped seal is located radially inward of the respective first and second expansible member and operatively connected thereto, the respective ring-shaped seals being sized to directly contact the supporting rod.

2. The apparatus of claim 1, wherein the connection member comprises a tubular body extending along the vertical axis.

3. The apparatus of claim 2, wherein the tubular body has a finned outer surface.

4. The apparatus of claim 1, wherein the connection member has a length, taken along the vertical axis of from 5 to 20 cm.

5. The apparatus of claim 1, wherein each of the first and second expansible member comprises:

a pleated portion configured to expand, contract and bend, a non-axially expandable portion contiguous to the pleated portion along the vertical axis, and a base contiguous to the pleated portion and opposite to the non-expandable portion, the base extending radially outwardly of the pleated portion, wherein the first and second ring-shaped seal are engaged respectively to the non-axially expandable portion.

6. The apparatus of claim 5, wherein the non-axially expandable portion engaging the ring-shaped seal lies on top of the pleated portion.

7. The apparatus of claim 1, wherein each of the first and second ring-shaped seal has an inner diameter configured to directly contact the supporting rod.

8. The apparatus of claim 7, wherein the hood comprises a hood sidewall and a lower flange positioned opposite to the hood lid, the hood lower flange extending radially inwardly from the hood sidewall and having an inner diameter substantially equal to the inner diameter of the connection member.

9. The apparatus of claim 8 further comprising a lower cover plate configured to be positioned on the lower flange and having a through hole in alignment with the through hole of the hood lid, wherein the lower cover plate has an outer diameter greater than the inner diameter of the connection member.

10. The apparatus of claim 9, wherein the sealing assembly further comprises:

a plurality of springs extending parallel to the vertical axis and arranged so as to radially surround the first sealing element, and an annular supporting flange placed on the lower cover plate, the plurality of springs being constrained, at one end, to the supporting flange and extending therefrom toward the hood lid.

11. The apparatus of claim 10, wherein each of the plurality of springs is mounted on a respective vertical supporting element fixed to the supporting flange, each of the plurality of springs being longer than the respective vertical supporting element, and wherein each of the plurality of springs has a length sized to extend from the annular flange to the hood lid in a pre-set partially compressed condition.

12. The apparatus of claim 8, wherein the connection member comprises a tubular body extending along the vertical axis and the hood is removably connected to the connection member, the connection member comprises an upper flange positioned at the top of its tubular body and extends radially outwardly from the same, and wherein the hood lower flange is positioned on the upper flange of the connection member tubular body and connected to the same.

13. The apparatus of claim 8 wherein the connection member comprises a tubular body extending along the vertical axis and the hood is integral with the connection member and the hood lower flange is integral with the tubular body of the connection member, the hood lower flange being a common flange for both the connection member and the hood.

14. The apparatus of claim 1, further comprising an upper cover plate placed on the hood lid, the upper cover plate having a central through hole in alignment with the through hole of the hood lid.

15. The apparatus of claim 14, wherein the second sealing element sticks out from the upper cover plate in axial alignment with the first sealing element.

* * * * *